United States Patent [19]
Kim

[11] Patent Number: 5,877,893
[45] Date of Patent: Mar. 2, 1999

[54] HOLOGRAPHIC SCREEN HAVING LIGHT ABSORBERS FOR ABSORBING AMBIENT LIGHT

[75] Inventor: Yong-ki Kim, Suwon, Rep. of Korea

[73] Assignee: Samsung Electronics Co., Ltd., Kyungki-Do, Rep. of Korea

[21] Appl. No.: 827,251

[22] Filed: Mar. 28, 1997

[30]  Foreign Application Priority Data

Mar. 30, 1996 [KR] Rep. of Korea ................... 1996-9646

[51] Int. Cl.⁶ ................................................. G03B 21/60
[52] U.S. Cl. ............................................................ 359/456
[58] Field of Search .................................. 359/453, 455, 359/456, 457, 460; 430/1, 2

[56] References Cited

U.S. PATENT DOCUMENTS

| | | | |
|---|---|---|---|
| 3,966,301 | 6/1976 | Brown | 350/128 |
| 4,923,280 | 5/1990 | Clausen et al. | 350/128 |
| 4,927,233 | 5/1990 | Nakanishi et al. | 350/128 |
| 4,993,806 | 2/1991 | Clausen et al. | 350/128 |
| 5,064,273 | 11/1991 | Lee | 359/457 |
| 5,206,761 | 4/1993 | Ogino | 359/457 |
| 5,615,045 | 3/1997 | Takuma et al. | 359/456 |
| 5,661,600 | 8/1997 | Mitani et al. | 359/457 |
| 5,668,662 | 9/1997 | Magocs et al. | 359/452 |

FOREIGN PATENT DOCUMENTS

| | | | |
|---|---|---|---|
| 0 114 395 | 8/1984 | European Pat. Off. | G03B 21/62 |
| 0 357 070 | 3/1990 | European Pat. Off. | G02B 6/08 |
| 3-87819 | 4/1991 | Japan | G03B 21/62 |
| 84/00616 | 2/1984 | WIPO | G02B 5/32 |

OTHER PUBLICATIONS

GB Search Report.

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

A holographic screen of a rear projection type for use in a projector for transmitting projection light received from a rear end of the projector onto a viewing surface. The holographic screen includes a holographic sheet having an incident surface for receiving projection light, a viewing surface for forming the projection light received by the incident surface into a viewable image, a plurality of protrusions disposed in parallel with each other for scattering the received projection light; and a plurality of light absorbers which are formed between the plurality of the protrusions on the viewing surface, for absorbing ambient light incident to the viewing surface. Thus, an image whose contrast is improved is displayed on a viewing surface.

8 Claims, 2 Drawing Sheets

HOLOGRAPHIC SCREEN HAVING LIGHT ABSORBERS FOR ABSORBING AMBIENT LIGHT

BACKGROUND OF THE INVENTION

The present invention relates to a rear projection screen for use in a projector, and more particularly, to a holographic screen for use in a rear projection screen.

A conventional rear projection screen contains a diffusion material. Rear projection screens commonly use a lenticular lens and a Fresnel lens. However, such a lenticular-Fresnel screen has a narrow angle of view and limited luminescence. As a result, a holographic screen has been proposed to overcome these problems.

Since holographic screens are manufactured easily once a master is fabricated and the features of the screen can be adjusted easily, holographic screens are popular in rear projection screens.

FIG. 1A is a perspective view showing a conventional holographic screen which is used as a rear projection screen. FIG. 1B is a sectional view cut along line 1—1 of the screen of FIG. 1A. The holographic screen, having a variety of shapes, comprises a Fresnel lens sheet 6 and a holographic sheet 8. The holographic screen is made of a polymer of a transparent acryl-group such as acryl and polymethylmetacrylate (PMMA). The Fresnel lens sheet 6 is located between a projection light source and the holographic sheet 8, and has an uneven shape on the surface opposite the light source, which varies a focal point of projection light incident from a light source, on the surface opposite the light source. Thus, the projection light transmitting the Fresnel lens sheet 6 has a substantially uniform light distribution on the surface of the holographic screen. The projection light output from the Fresnel lens sheet 6 is incident to the holographic sheet 8. The holographic sheet 8 is formed on the viewing surface of the holographic screen, and has a diffusion plate function for forming an image by scattering the light incident from the Fresnel lens sheet 6. Protrusions 4 constituting the holographic sheet 8 are formed on the viewing surface of the screen and are disposed in parallel with the vertical axis of the holographic sheet 8. The protrusions 4 are spaced from each other in predetermined intervals along the horizontal direction of the screen. Most of the light incident from the Fresnel lens sheet 6 projects onto the holographic sheet 8. The projection light incident to the holographic sheet 8 is scattered by the protrusions 4 to form an image.

However, due to low contrast, an image formed on the holographic screen is not completely discernable in ambient light.

SUMMARY OF THE INVENTION

To solve the above problem, it is an object of the present invention to provide a holographic screen providing a good image quality by improving its contrast.

To accomplish the above object of the present invention, a holographic screen of a rear projection type is provided for use in a projector for transmitting projection light from a rear end of the projector onto a viewing surface, the holographic screen comprising: a holographic sheet including an incident surface for receiving projection light, a viewing surface for forming the projection light into an image to be viewed, a plurality of vertically or horizontally parallel protrusions for scattering the projection light, and a plurality of light absorbers which are formed between the plurality of the protrusions on the viewing surface, for absorbing ambient light incident to the viewing surface.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described in detail with reference to the accompanying drawings.

Figure 1A:
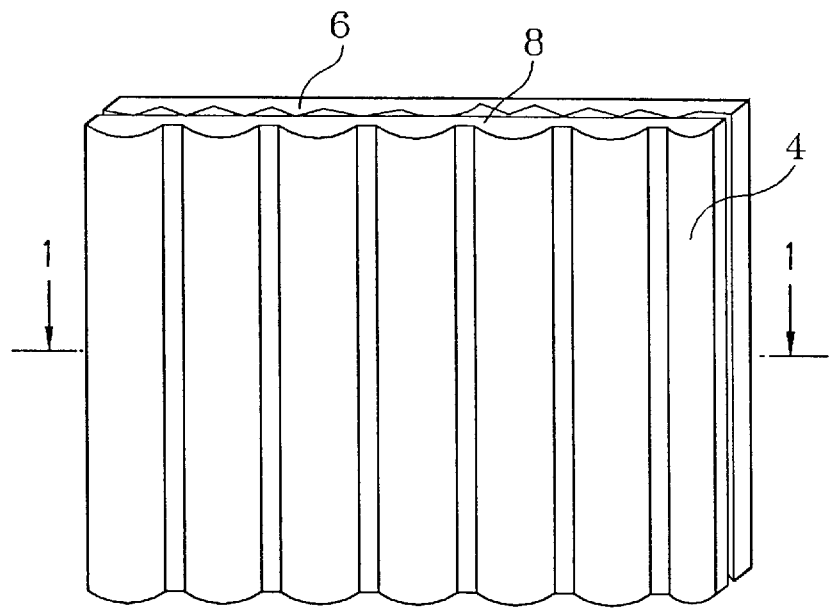
FIG. 1A is a perspective view showing a conventional holographic screen which is used as a rear projection screen.
Figure 1B:
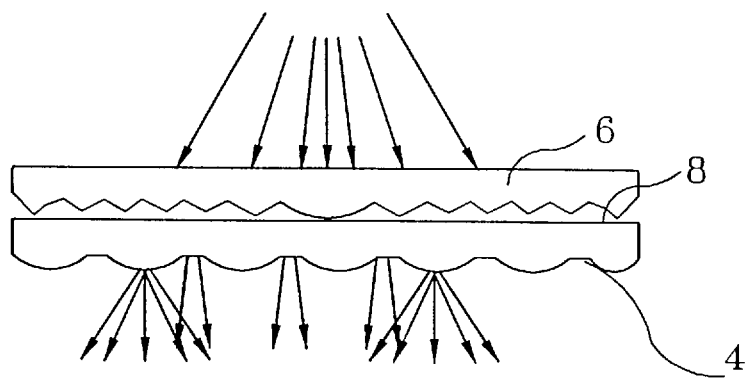
FIG. 1B is a sectional view cut along line 1—1 of the screen of FIG. 1A.
Figure 2A:
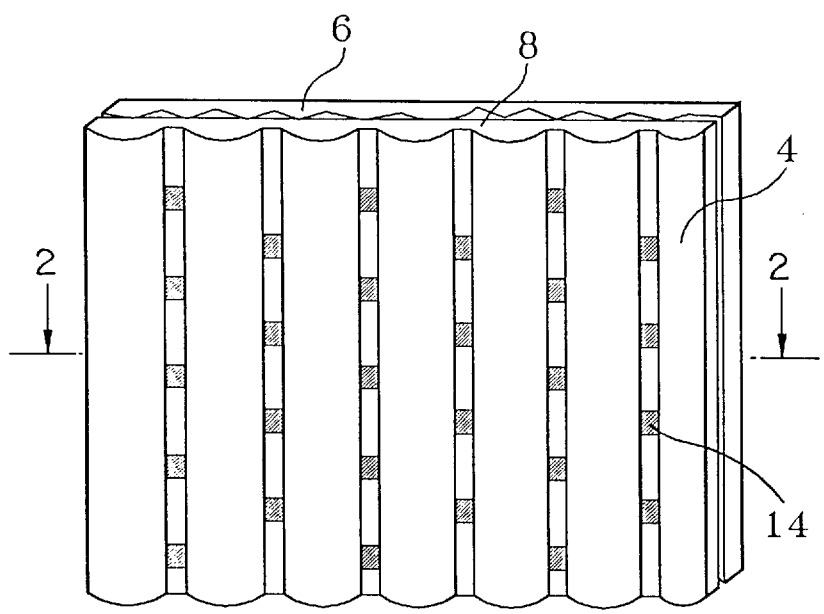
FIG. 2A is a perspective view of a holographic screen according to a preferred embodiment of the present invention.

In FIG. 2A, the holographic screen includes a Fresnel lens sheet 6, a holographic sheet 8 and a plurality of protrusions 4. The plurality of protrusions 4 are formed on a viewing surface of a projection screen as shown in FIG. 1, and disposed in parallel with each other with respect to the vertical axis of the holographic sheet 8. The protrusions 4 are spaced in predetermined intervals along the horizontal direction of the screen.

The holographic sheet 8 comprises a plurality of light absorbers 14 each of which is formed between two neighboring protrusions 4. The plurality of light absorbers 14 absorb ambient light incident to a viewing surface from the outside of the screen. When the light absorbers 14 are not used, the ambient light incident to the viewing surface is irregularly reflected on the viewing surface, thus, lowering the contrast of an image formed on the viewing surface of the holographic sheet 8.

Therefore, the light absorbers 14 prevent the lowering of the contrast of the image due to the ambient light. The light absorbers 14 rarely transmit the light incident from the Fresnel lens sheet 6. Therefore, although the light absorbers 14 occupy a portion of the viewing surface, light loss is not brought about by the surface area occupied by the light absorbers 14. Thus, the holographic screen of FIG. 2A maintains substantially the same efficiency with respect to the light projected from a light source (not shown) as a screen without light absorbers 14.

Figure 2B:
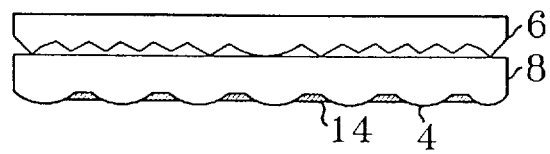
FIG. 2B is a sectional view cut along a line 2—2 of the screen of FIG. 2A.

Each light absorber 14 is formed by a coating on the viewing surface of the holographic sheet 8 as shown in FIG. 2B, and has a flat, rectangular shape as shown in FIG. 2A. It is desirable that the light absorbers 14 are made of a material having an optical characteristic for completely absorbing the ambient light incident to themselves. Therefore, the light absorbers 14 in the preferred embodiment are made of a black material having a high rate of absorption of light. The light absorbers 14 occupy 25% of the entire surface area of the viewing surface of the holographic screen. The surface area occupied by the light absorbers 14 on the viewing surface can be enlarged. However, as the surface area occupied by the light absorbers 14 becomes wider, the brightness of the image formed on the viewing surface is lowered. Thus, it is preferable that the light absorbers 14 occupy about 25% of the entire surface area of the viewing surface of the holographic screen.

The above embodiment has been described with respect to the protrusions 14 which are disposed in parallel with each other in the vertical direction and the light absorbers 14 disposed between the protrusions 14. However, it should be understood that the protrusions 14 can be disposed in parallel with each other in the horizontal direction.

The holographic screen of the above-described embodiment includes the Fresnel lens sheet 6 and the holographic sheet 8. However, since a holographic sheet 8 can be fabricated so that light projected from a light source advances to a particular direction, a holographic screen according to the present invention can be manufactured using only a holographic sheet 8.

As described above, the holographic screen according to the present invention forms a plurality of light absorbers for absorbing ambient light between the protrusions, to bring about an effect for improving a contrast of an image formed on a viewing surface.

While only certain embodiments of the invention have been specifically described herein, it will be apparent that numerous modifications may be made thereto without departing from the spirit and scope of the invention.

What is claimed is:

1. A holographic screen of a rear projection type for use in a projector for transmitting projection light received from a rear end of the projector onto a viewing surface, the holographic screen comprising:

a holographic sheet including an incident surface for receiving projection light, a viewing surface for forming the received projection light into an image to be viewed;

a plurality of protrusions which are disposed in parallel with each other for scattering the received projection light wherein a space is formed between each adjacent pair of protrusions; and a plurality of light absorbers which are distributed on each space, for absorbing ambient light incident to said viewing surface.

2. The holographic screen of a rear projection type according to claim 1, wherein said plurality of light absorbers formed between the adjacent protrusions are in a rectangular shape.

3. The holographic screen of a rear projection type according to claim 2, wherein said plurality of light absorbers absorb ambient light incident to themselves.

4. The holographic screen of a rear projection type according to claim 3, wherein said plurality of light absorbers occupy approximately 25% of the entire surface area of said viewing surface.

5. The holographic screen of a rear projection type according to claim 2, wherein said plurality of light absorbers are black coated materials.

6. The holographic screen of a rear projection type according to claim 1, further comprising a Fresnel lens sheet which converges the projection light from the rear end of the projector onto said incident surface of said holographic sheet.

7. The holographic screen of a rear projection type according to claim 1, wherein said plurality of protrusions are disposed in vertically, parallel rows on said viewing screen.

8. The holographic screen of a rear projection type according to claim 1, wherein said plurality of protrusions are disposed in horizontally, parallel rows across said viewing screen.

* * * * *